United States Patent
Choi et al.

(10) Patent No.: US 12,085,933 B2
(45) Date of Patent: *Sep. 10, 2024

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventors: Jung Eun Choi, Seoul (KR); Jae Pil Hwang, Seoul (KR); Wan Jae Lee, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 384 days.

This patent is subject to a terminal disclaimer.

(21) Appl. No.: 17/546,596

(22) Filed: Dec. 9, 2021

(65) Prior Publication Data
US 2022/0413492 A1 Dec. 29, 2022

(30) Foreign Application Priority Data
Jun. 25, 2021 (KR) .................. 10-2021-0083395

(51) Int. Cl.
*G08G 1/16* (2006.01)
*B60W 60/00* (2020.01)
*G05D 1/00* (2006.01)
*G06F 3/0482* (2013.01)

(52) U.S. Cl.
CPC ......... *G05D 1/0038* (2013.01); *B60W 60/001* (2020.02); *G06F 3/0482* (2013.01); *G08G 1/16* (2013.01)

(58) Field of Classification Search
CPC .... B60W 60/001; B60W 50/14; B60W 30/10; B60W 2556/45; B60W 2050/146; G05D 1/0038; G08G 1/16; G08G 1/166; G08G 1/165; G08G 1/164; G08G 1/096725; G06F 3/0482
See application file for complete search history.

(56) References Cited

U.S. PATENT DOCUMENTS

| | | | |
|---|---|---|---|
| 10,317,899 B2 | 6/2019 | Liu et al. | |
| 11,370,391 B1* | 6/2022 | Gammelgard | G06Q 10/08 |
| 2020/0209845 A1 | 7/2020 | Chen | |

(Continued)

FOREIGN PATENT DOCUMENTS

| | | |
|---|---|---|
| JP | 2019-185279 A | 10/2019 |
| JP | 2020-154631 A | 9/2020 |
| JP | 2020-205037 A | 12/2020 |

OTHER PUBLICATIONS

Gan et al., Control system design of an autonomous surface vehicle, 2017, IEEE, p. 495-499 (Year: 2017).*

(Continued)

*Primary Examiner* — Mcdieunel Marc
(74) *Attorney, Agent, or Firm* — MORGAN, LEWIS & BOCKIUS LLP (57) ABSTRACT

An autonomous vehicle may include a processor configured to transmit vehicle data for remote control of the autonomous vehicle to a control system when the remote control of the autonomous vehicle is required, and when receiving a remote control command for the remote control from the control system, to generate and follow a path based on the received remote control command.

20 Claims, 8 Drawing Sheets

(56) References Cited

U.S. PATENT DOCUMENTS

| | | | | |
|---|---|---|---|---|
| 2022/0266865 A1* | 8/2022 | Hayashi | ........ | G08G 1/164 |
| 2022/0266870 A1* | 8/2022 | Hayashi | ........ | G05D 1/0011 |
| 2022/0365530 A1* | 11/2022 | Foster | ........ | B60W 60/0015 |
| 2023/0024474 A1* | 1/2023 | Ren | ........ | H04N 5/265 |
| 2023/0054759 A1* | 2/2023 | Robinson | ........ | G01S 17/931 |
| 2023/0133992 A1* | 5/2023 | Ganju | ........ | H04B 17/23 |
| | | | | 370/252 |
| 2023/0139933 A1* | 5/2023 | Tam | ........ | G07C 5/008 |
| | | | | 701/26 |
| 2023/0341852 A1* | 10/2023 | Huang | ........ | G02B 27/017 |
| 2024/0046363 A1* | 2/2024 | Shalev-Shwartz | ........ | |
| | | | | B60W 30/095 |
| 2024/0046798 A1* | 2/2024 | Oara | ........ | B60W 30/165 |

OTHER PUBLICATIONS

Kim et al., Experiments in remote monitoring and control of autonomous underwater vehicles, 1996, IEEE, p. 411-418 (Year: 1996).*

Rahnamai et al., Formations of autonomous vehicles using Global Positioning Systems (GPS), 2005, IEEE, p. 1-6 (Year: 2005).*

Juang et al., The Implementation of Remote Monitoring, 2019, IEEE, p. for Autonomous Driving, 2019, IEEE, p. 53-56 (Year: 2019).*

* cited by examiner

```
<Remote Control Command>

☐ Ignoring misrecognized object
☐ Changing lane (left side)
☐ Ignoring a maximum road speed
  Changing lane (right side)
  Ignoring traffic signal,
  Responding to hand signal
```

AUTONOMOUS VEHICLE, CONTROL SYSTEM FOR REMOTELY CONTROLLING THE SAME, AND METHOD THEREOF

CROSS-REFERENCE TO RELATED APPLICATION

The present application claims priority to Korean Patent Application No. 10-2021-0083395, filed on Jun. 25, 2021, the entire contents of which is incorporated herein for all purposes by this reference.

BACKGROUND OF THE INVENTION

Field of the Invention

The present invention relates to an autonomous vehicle, a control system for remotely controlling the same, and a method thereof, and more particularly, to a technique for facilitating the control system to remotely control the autonomous vehicle.

Description of Related Art

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or a passenger.

While driving in an autonomous driving mode, there may be a situation in which it is impossible to follow a driving path to the destination normally although there is no abnormality in a function of the vehicle. Accordingly, when a situation where it is impossible to follow a path occurs during autonomous driving, it is often difficult to follow the driving path, such as when the driver directly intervenes in control of the vehicle or when the driver's intervention is difficult, the vehicle stops.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous vehicle, a control system for remotely controlling the same, and a method thereof, configured for facilitating the control system to remotely control the autonomous vehicle when a situation where it is impossible to follow a driving path of the autonomous vehicle occurs.

The technical objects of the present invention are not limited to the objects mentioned above, and other technical objects not mentioned may be clearly understood by those skilled in the art from the description of the claims.

Various aspects of the present invention are directed to providing an autonomous vehicle, including a processor configured to transmit vehicle data for remote control of the autonomous vehicle to a control system when the remote control of the autonomous vehicle is required, and when receiving a remote control command for the remote control from the control system, to generate and follow a path based on the received remote control command.

In various exemplary embodiments of the present invention, the autonomous vehicle may further include a control terminal configured to communicate with the autonomous driving control apparatus and the control system.

In various exemplary embodiments of the present invention, the processor may determine a situation in which the vehicle is unable to travel on an existing path due to a driving situation or an emergency situation as a situation requiring the remote control.

In various exemplary embodiments of the present invention, the vehicle data may include at least one of image information around the vehicle, surrounding object information, a position of the vehicle, a vehicle path, speed information of the vehicle, indoor image information, or map information.

In various exemplary embodiments of the present invention, the autonomous vehicle may further include a sensing device configured to detect a vehicle surrounding situation and a vehicle indoor situation.

In various exemplary embodiments of the present invention, the remote control command may include at least one of ignoring a misrecognized object, changing a lane, ignoring a maximum road speed, ignoring a traffic signal, or responding to a hand signal.

Various aspects of the present invention are directed to providing a control system including: a processor configured to generate a remote control command list based on vehicle data received from an autonomous vehicle, to receive selection of one command in the remote control command list from an operator, and to transmit the selected remote control command to the autonomous vehicle when remote control of the autonomous vehicle is required.

In various exemplary embodiments of the present invention, the control system may further include a display device configured to display the vehicle data.

In various exemplary embodiments of the present invention, the processor may mark a current position of the autonomous vehicle, surrounding object information, and a vehicle path on a map to display the current position on the display device.

In various exemplary embodiments of the present invention, the processor may generate the remote control command list by determining a priority of the remote control command using a collision risk degree.

In various exemplary embodiments of the present invention, the processor may generate the remote control command list by determining a priority of the remote control command using a collision risk degree.

In various exemplary embodiments of the present invention, the processor may display the remote control command list on a graphic basis.

In various exemplary embodiments of the present invention, the remote control command may include at least one of ignoring a misrecognized object, changing a lane, ignoring a maximum road speed, ignoring a traffic signal, or responding to a hand signal.

In various exemplary embodiments of the present invention, the processor, when the ignoring of the misrecognized object is selected in the remote control command list, may receive selection of an object to be ignored among surrounding objects from an operator.

In various exemplary embodiments of the present invention, the processor may deactivate a remote control command having no drivable path in a current situation in the remote control command list to display it.

In various exemplary embodiments of the present invention, the processor may emphasize a remote control command having a highest priority in the remote control command list by use of at least one of displaying at a top, blinking, darkening, or highlighting.

In various exemplary embodiments of the present invention, the display device may receive selection of one remote control command in the remote control command list from the operator by use of a mouse or a touch method.

Various aspects of the present invention are directed to providing a remote control method for an autonomous vehicle, including: receiving vehicle data received from an autonomous vehicle when remote control of the autonomous vehicle is required; generating and displaying a remote control command list based on the vehicle data; receiving selection of one command of the remote control command list from an operator; and transmitting the selected remote control command to the autonomous vehicle.

In various exemplary embodiments of the present invention, the generating and displaying of the remote control command list may include marking a current position of the autonomous vehicle, surrounding object information, and a vehicle path on a map.

In various exemplary embodiments of the present invention, the generating and displaying of the remote control command list may include generating the remote control command list by determining a priority of the remote control command using a collision risk degree.

In various exemplary embodiments of the present invention, the generating and displaying of the remote control command list may include generating the remote control command list by determining a priority of the remote control command using a collision risk degree.

According to the present technique, the control system may be enabled to remotely control the autonomous vehicle when a situation where it is impossible to follow a driving path of the autonomous vehicle occurs, facilitating the autonomous vehicle to smoothly drive. Furthermore, the present technique, an operator is allowed to intuitively determine a situation of the autonomous vehicle and to instruct it by intuitively displaying data of the autonomous vehicle on a screen of the control system.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 8.

Figure 1:
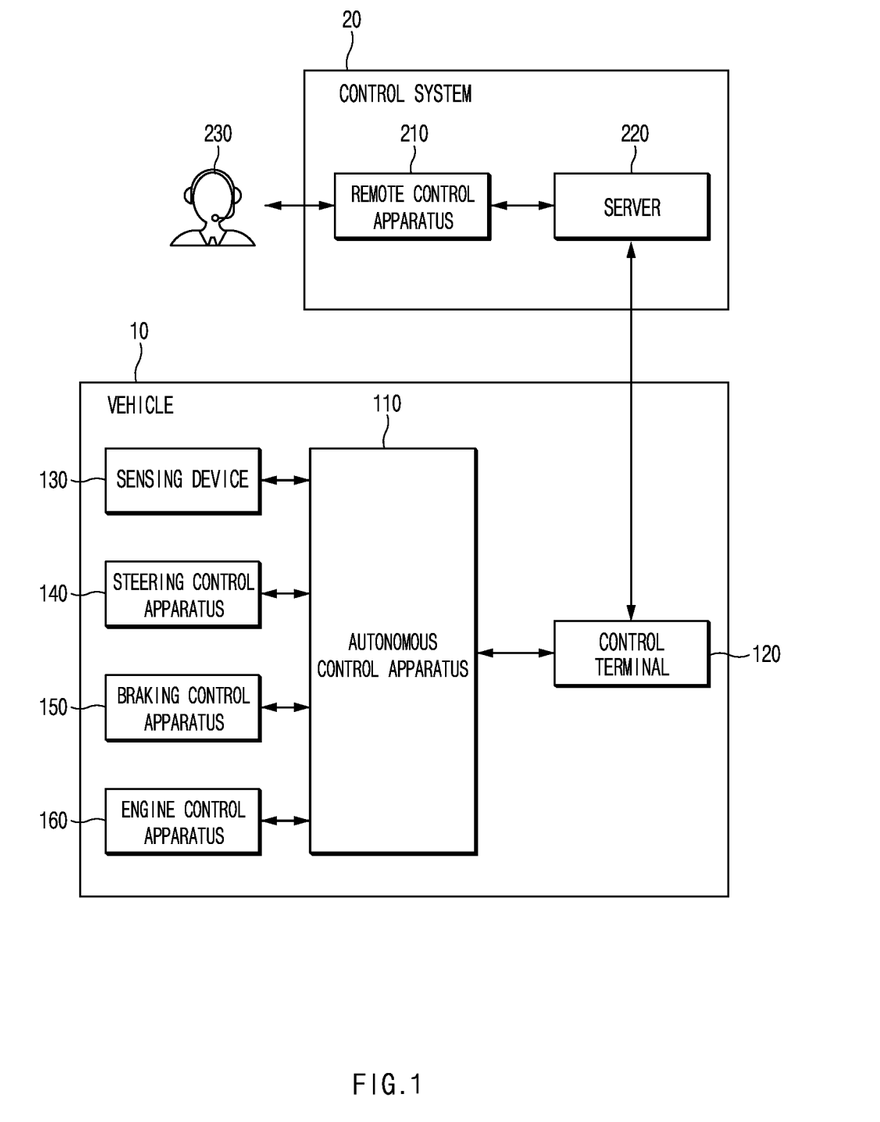
FIG. 1 illustrates a block diagram showing a configuration of a remote control system for an autonomous apparatus according to various exemplary embodiments of the present invention.
Figure 2:
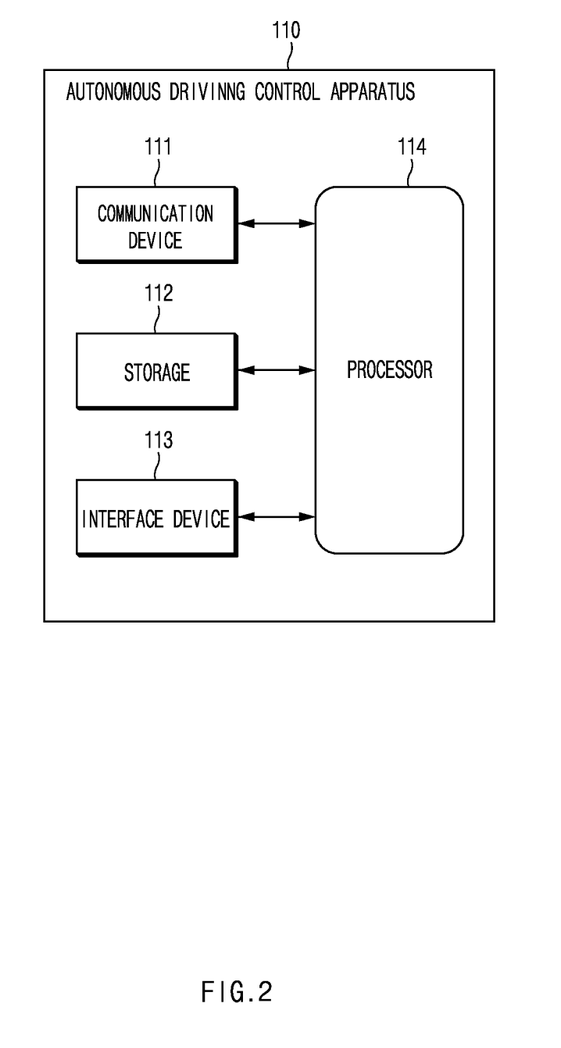
FIG. 2 illustrates a detailed schematic diagram of an autonomous driving control apparatus according to various exemplary embodiments of the present invention.
Figure 3:
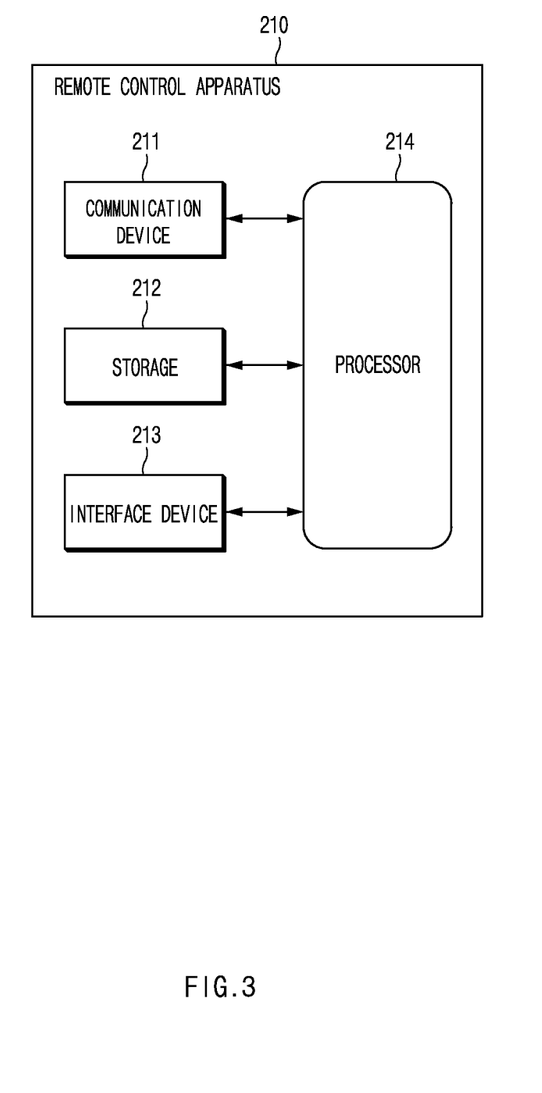
FIG. 3 illustrates a detailed schematic diagram of a remote control apparatus according to various exemplary embodiments of the present invention.

FIG. 1 illustrates a block diagram showing a configuration of a remote control system for an autonomous apparatus according to various exemplary embodiments of the present invention, FIG. 2 illustrates a detailed schematic diagram of an autonomous driving control apparatus according to various exemplary embodiments of the present invention, and FIG. 3 illustrates a detailed schematic diagram of a remote control apparatus according to various exemplary embodiments of the present invention.

Referring to FIG. 1, the remote control system for an autonomous vehicle according to various exemplary embodiments of the present invention includes a vehicle 10 and a control system 20, and remote control may be performed through communication between the vehicle 10 and the control system 20. In the instant case, the vehicle 10 may include an autonomous vehicle.

The vehicle 10 may include an autonomous driving control apparatus 110, a control terminal 120, a sensing device 130, a steering control apparatus 140, a braking control apparatus 150, and an engine control apparatus 160.

The autonomous driving control apparatus 100 according to the exemplary embodiment of the present invention may be implemented inside the vehicle. In the instant case, the autonomous driving control apparatus 100 may be integrally formed with internal control units of the vehicle, or may be implemented as a separate device to be connected to control units of the vehicle by a separate connection means.

The autonomous driving control apparatus 100 may transmit vehicle data for remote control to the control system in the case of a situation where the remote control of an autonomous vehicle is required, and when receiving a remote control command for the remote control from the control system, may generate and follow a path based on the remote control command.

Referring to FIG. 1, the autonomous driving control apparatus 100 may include a communication device 111, a storage 112, an interface unit 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, and the like.

The storage 112 may store sensing results of the sensing device 130 and data and/or algorithms required for the processor 114 to operate, and the like.

As an example, the storage 112 may store a vehicle path, image data photographed through a camera, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the apparatus 100 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The interface device 113 may be implemented as a head-up display (HUD), a cluster, an audio video navigation (AVN), a human machine interface (HM), a user setting menu (USM), or the like.

For example, the interface device 113 may display data transmitted and received with respect to the control system 20, a driving path of the vehicle, a remote control command received from the control system 20, and the like.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The processor 114 may be electrically connected to the communication device 111, the storage 112, the interface device 113, and the like, may electrically control each component, and may be an electrical circuit that executes software commands, thereby performing various data processing and calculations described below.

The processor 114 may process a signal transferred between components of the autonomous driving control apparatus 100, and may perform overall control such that each of the components can perform its function normally.

The processor 114 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 114 may determine a situation in which remote control of the autonomous vehicle is required. That is, the processor 114 may determine a situation in which the vehicle cannot travel on an existing path due to a driving situation or an emergency situation as a situation requiring the remote control.

The processor 114 may transmit vehicle data for remote control to the control system 20, and when receiving a remote control command for remote control from the control system 20, may generate and follow a path based on the received remote control command. In the instant case, the vehicle data may include at least one of image information around the vehicle, surrounding object information, a position of the vehicle, a vehicle path, speed information of the vehicle, indoor image information, or map information.

Furthermore, the remote control command may include at least one of ignoring a misrecognized object, changing a lane, ignoring a maximum road speed, ignoring a traffic signal, or responding to a hand signal. For example, when receiving a hand signal corresponding command from the control system 20, the processor 114 may control the vehicle to automatically stop at a hand signal corresponding point (e.g., an intersection stop line).

The control terminal 120 may receive vehicle data, etc. from the autonomous driving control apparatus 100, and may transmit it to the control system 20. To the present end, the control terminal 120 may include a communication device such as a modem. Furthermore, the control terminal 120 may perform wireless communication with the control system 20 through a wireless communication technique. Herein, the wireless communication technique may include wireless LAN (WLAN), wireless broadband (Wibro), Wi-Fi, Worldwide Interoperability for Microwave Access (WiMAX), etc. For example, the control terminal 120 may receive a remote control command from the control system 20 to transmit it to the autonomous driving control apparatus 110.

The present invention includes an example in which the control terminal 120 separately mounted on the vehicle 10 performs communication with the control system 20, but the present invention is not limited thereto, and it may be implemented to communicate with the control system 20 through the communication device 111 of the autonomous driving control apparatus 110 without separately providing the control terminal 120.

The sensing device 130 may include one or more sensors that detect an obstacle, e.g., a preceding vehicle, positioned around the host vehicle and measure a distance with the obstacle and/or a relative speed thereof.

The sensing device 130 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). To the present end, the sensing device 200 may include an ultrasonic sensor, a radar, a camera, a laser scanner, and/or a corner radar, a Light Detection and Ranging (LiDAR), an acceleration sensor, a yaw rate sensor, a torque measurement sensor and/or a wheel speed sensor, a steering angle sensor, etc.

Furthermore, the sensing device 130 may collect implicit information related to a vehicle interior, and to the present end, the sensing device 130 may include a vehicle indoor camera. For example, the implicit information may include a case in which a passenger leaves an object in the vehicle and gets off the vehicle.

The steering control device 140 may be configured to control a steering angle of a vehicle, and may include a steering wheel, an actuator interlocked with the steering wheel, and a controller configured for controlling the actuator.

The braking control device 150 may be configured to control braking of the vehicle, and may include a controller that is configured to control a brake thereof.

The engine control unit (ECU) 160 may be configured to control engine driving of a vehicle, and may include a controller that is configured to control a speed of the vehicle.

Meanwhile, the control system 20 includes a remote control apparatus 210 and a server 220.

In the case of a situation where remote control of the autonomous vehicle is required, the remote control apparatus 210 may generate a remote control command list based on vehicle data received from the autonomous vehicle, and may receive selection of one command in the remote control command list from an operator, to transmit the selected remote control command to the autonomous vehicle.

The operator may check a situation (e.g., obstacle, collision occurrence) and the path of the autonomous vehicle through a screen of the remote control apparatus 210. In the instant case, the operator is a person who is authorized to access the remote control apparatus 210, and may be disposed in a place that the access to the remote control apparatus 210 is possible, such as an office inside the vehicle or outside the vehicle.

Referring to FIG. 3, the remote control apparatus 210 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, Ethernet communication, and the like.

The storage 212 may store vehicle data received from the vehicle 10, and data and/or algorithm required for the processor 214 to operate, and the like.

As an example, the storage 212 may store a vehicle path received from the vehicle 10, image data photographed through a camera, a remote control command selected by the operator 230, and the like.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means for receiving a control command from an operator and an output means for outputting an operation state of the apparatus 200 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the instant case, the display may include at least one of a liquid crystal display (LCD), a thin film transistor liquid crystal display (TFT LCD), an organic light emitting diode display (OLED display), a flexible display, a field emission display (FED), or a 3D display.

For example, the interface device 213 may display map information in which data received from the vehicle 10, a driving path of the vehicle, a current position of the vehicle, information related to surrounding objects, and the like overlap.

For example, the interface device 213 may receive selection of one remote control command in the remote control command list from the operator 230 by use of a mouse or a touch method and transmit the selected remote control command to the processor 214.

For example, the interface device may include all communication terminals such as a personal computer (PC), a notebook computer, a smartphone, a tablet PC, a pad, a personal digital assistant (PDA), and a wearable device.

The processor 214 may be electrically connected to the communication device 211, the storage 212, the interface device 213, and the like, may electrically control each component, and may be an electrical circuit that executes software commands, thereby performing various data processing and calculations described below.

The processor 214 may process a signal transferred between components of the remote control apparatus 200, and may perform overall control such that each of the components can perform its function normally. The processor 214 may be implemented in a form of hardware, software, or a combination of hardware and software, or may be implemented as microprocessor.

When remote control of the autonomous vehicle 10 is required, the processor 214 may generate a remote control command list based on vehicle data received from the autonomous vehicle 10.

The processor 214 may mark a current position of the autonomous vehicle, surrounding object information, and a vehicle path on the map to display it on the screen through the interface device 213.

The processor 214 may generate a remote control command list by determining a priority of the remote control command using a collision risk degree. In the instant case, the collision risk degree indicates a degree of risk of collision with an obstacle, and the processor 214 may receive the collision risk degree from the vehicle or may determine the collision risk degree based on data received from the vehicle.

Furthermore, the processor 214 may generate a remote control command list by determining the priority of the remote control command using path efficiency. In the instant case, the path efficiency may be determined based on a driving time, a driving distance, a consumption cost of the path, and the like.

Furthermore, the processor 214 may generate a remote control command list by determining the priority of the remote control command using and the collision risk degree and the path efficiency.

Furthermore, the processor 214 may display the remote control command list on a graphic basis so that the operator 230 can check the remote control command at a glance.

When the ignoring of the misrecognized object is selected in the remote control command list, the processor 214 may receive selection of an object to be ignored among surrounding objects from the operator 230.

The processor 214 may deactivate a remote control command having no drivable path in a current situation in the remote control command list to display it.

The processor 214 may emphasize a remote control command having a highest priority in the remote control command list by use of at least one of displaying at a top, blinking, darkening, or highlighting.

When one command in the remote control command list is selected by the operator 230, the processor 214 may transmit the selected remote control command to the server 220 to transmit it to the autonomous vehicle 10.

The server 220 may perform relay between the remote control apparatus 210 and the vehicle 10, may store vehicle data received from the vehicle 10, and may store a remote control command received from the remote control apparatus 210, and the like.

The server 220 may perform wireless communication with the control terminal 120 of the vehicle 10 through a wireless communication technique. Herein, since the wireless communication technique is the same as that of the above-described control terminal 120, a detailed description thereof will be omitted.

The present invention includes an example in which the server 220 of the control system 20 communicates with the vehicle 10, but the present invention is not limited thereto, and it may be implemented to communicate with the vehicle 10 through the communication device 211 of the remote control apparatus 210 without configuring the server 220. Furthermore, the communication device 111 of the autonomous driving control apparatus 110 of the vehicle and the communication device 211 of the remote control apparatus 210 may directly communicate with each other.

Figure 4:
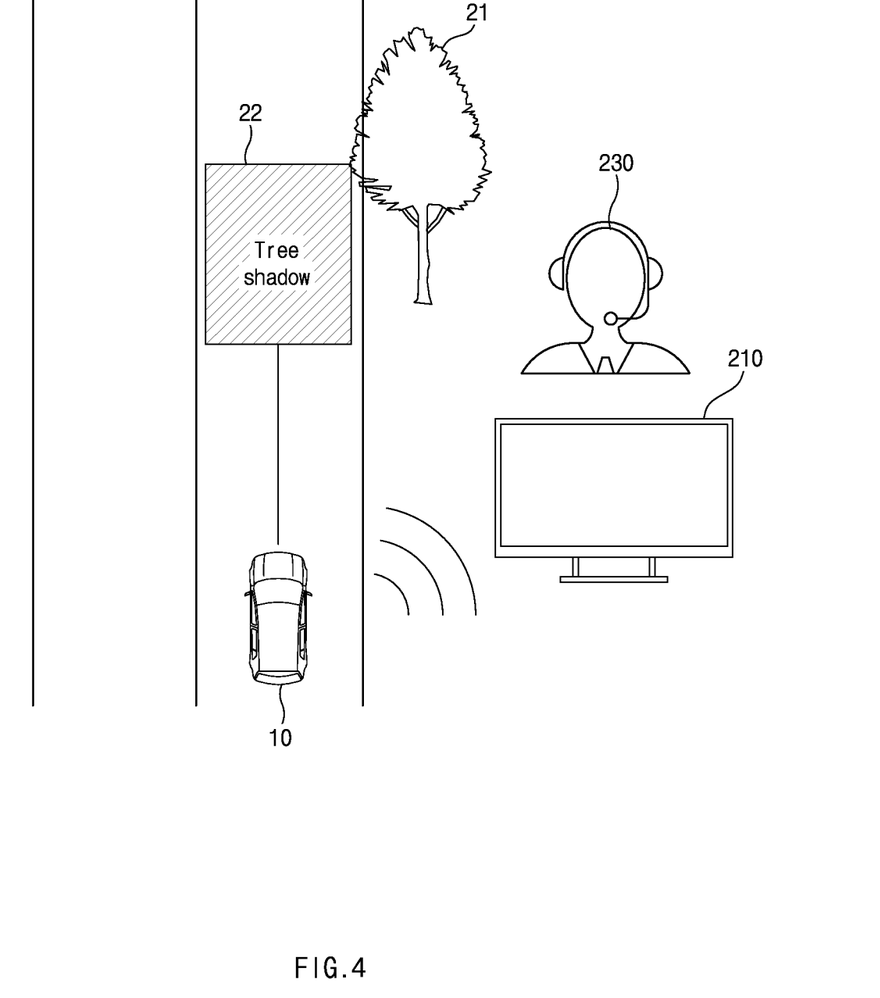
FIG. 4 illustrates a view for describing an example of a situation in which it is impossible to follow a path during autonomous driving according to various exemplary embodiments of the present invention.
Figure 5:
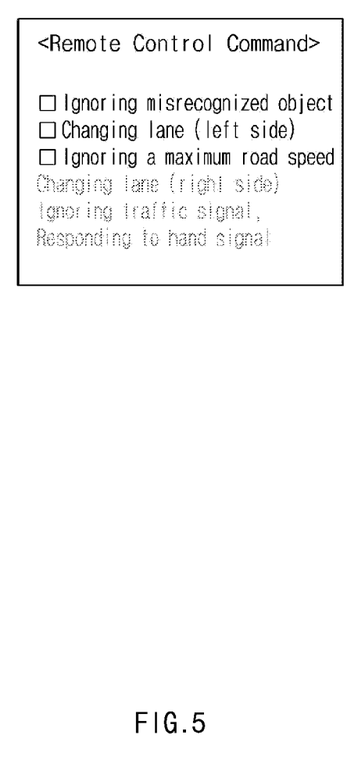
FIG. 5 illustrates a view for describing an example of a remote control command list of a remote control apparatus according to various exemplary embodiments of the present invention.
Figure 6:
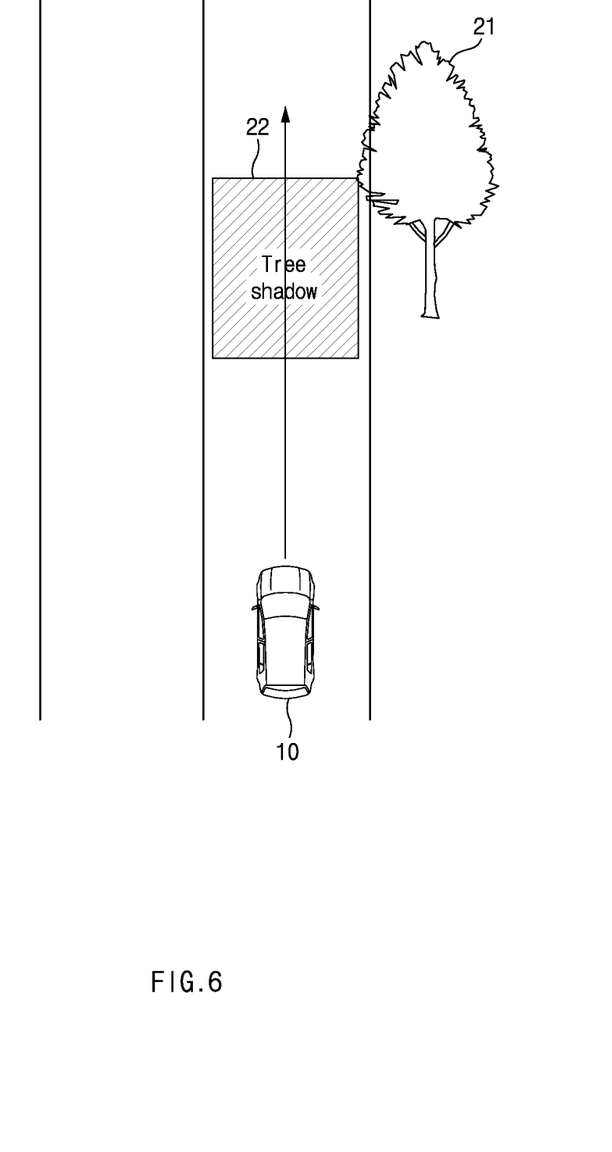
FIG. 6 illustrates a view for describing an example of a path depending on a remote control command of a remote control apparatus according to various exemplary embodiments of the present invention.

FIG. 4 illustrates a view for describing an example of a situation in which it is impossible to follow a path during autonomous driving according to various exemplary embodiments of the present invention, and FIG. 5 illustrates a view for describing an example of a remote control command list of a remote control apparatus according to various exemplary embodiments of the present invention. FIG. 6 illustrates a view for describing an example of a path depending on a remote control command of a remote control apparatus according to various exemplary embodiments of the present invention.

Referring to FIG. 4, when the vehicle 10 misrecognizes a tree shadow 22 caused by a tree 21 on a roadside as an obstacle during autonomous driving, the vehicle 10 determines a situation in which it is unable to continue driving on a planned existing path.

Accordingly, the vehicle 10 determines that remote control is required, and transmits vehicle data such as images around the vehicle and obstacle information to the control system 20.

Accordingly, the control system 20 displays the vehicle data received from the vehicle 10 on the screen, and receives selection of a remote control command from the operator 230. For example, the remote control command may include ignoring a misrecognized object, changing lanes (left), ignoring a maximum road speed, changing lanes (right), ignoring a traffic signal, responding to a hand signal, and the like, as illustrated in FIG. 5. In the instant case, the control system 20 may receive selection of an object to be ignored when the ignoring of the misrecognized object is selected by the operator 230 in the remote control command list. Furthermore, the control system 20 may set a remote control command that can generate a most efficient path with a low risk of collision in a current situation to have a highest priority to may display it at a top of the remote control command list. Furthermore, the control system 20 may deactivate a remote control command having no drivable path in a current situation to display it. Furthermore, the control system 20 may emphasize and display a remote control command having a highest priority in the remote control command list by blinking or the like. Furthermore, the control system 20 may emphasize and display a remote control command having a highest priority in the remote control command list in bold or through highlighting.

The control system 20 transmits information related to the remote control command selected by the operator 230 to the vehicle 10, and the vehicle 10 performs vehicle control depending on the received remote control command. Referring to FIG. 6, it may be seen that the ignoring misrecognized the object is selected, ignoring the tree shadow 22 and maintaining the existing path.

Accordingly, according to various exemplary embodiments of the present invention, the operator 230 may transmit a specific remote control command to the vehicle 10 through the remote control apparatus 210 to safely continue autonomous driving when it is determined that remote control of the vehicle is required during autonomous driving. Furthermore, according to various exemplary embodiments of the present invention, the operator 230 is allowed to intuitively grasp a driving situation of the vehicle and select a remote control command by displaying vehicle data such as a vehicle path and obstacles on the screen of the remote control apparatus 210.

Figure 7:
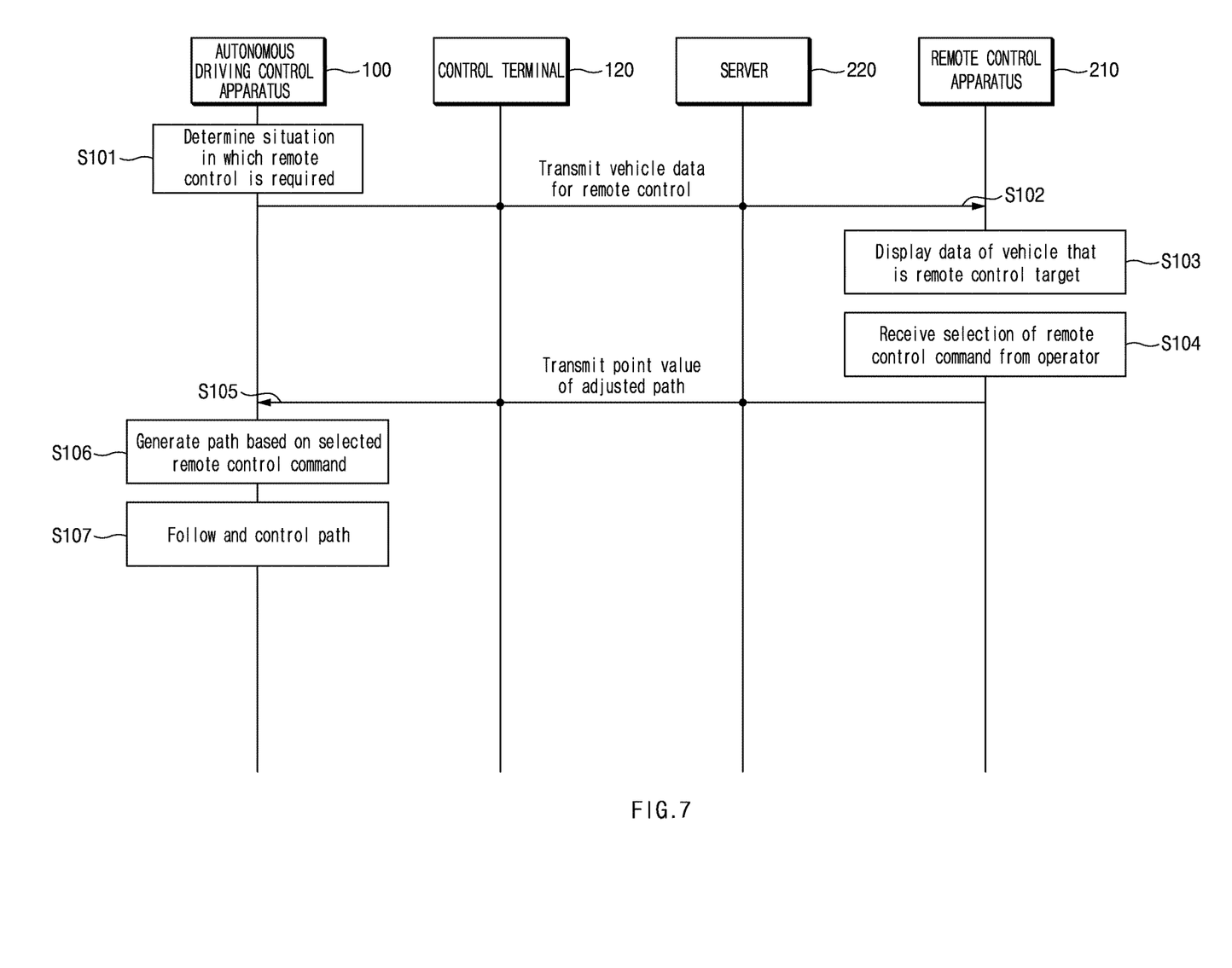
FIG. 7 illustrates an autonomous control method for a vehicle according to various exemplary embodiments of the present invention.

Hereinafter, a remote control method for an autonomous vehicle according to various exemplary embodiments of the present invention will be described in detail with reference to FIG. 7. FIG. 7 illustrates an autonomous control method for a vehicle according to various exemplary embodiments of the present invention.

Hereinafter, it is assumed that the autonomous driving control apparatus 100 of the of FIG. 1 performs processes of FIG. 7. Furthermore, in the description of FIG. 7, it may be understood that operations referred to as being performed by each device are controlled by a processor of each of the devices. In FIG. 7, the autonomous driving control apparatus 100 of the vehicle 10 and the remote control apparatus 210 of the control system 20 may perform communication through a control terminal 1200 and a server 220, respectively.

Referring to FIG. 7, the autonomous driving control apparatus 100 determines whether the remote control of the vehicle is required (S101). That is, the autonomous driving control apparatus 100 may determine that the remote control is required when the vehicle cannot normally follow a path to a destination while driving in the autonomous driving mode. In the instant case, the control system 20 may also receive vehicle data periodically from the autonomous driving control apparatus 100 of the vehicle to confirm that the remote control is required. Accordingly, when both the vehicle and an operator of the control system 20 recognize that the remote control is required, the remote control may be started.

When the remote control of the vehicle is required, the autonomous driving control apparatus 100 transmits vehicle data for remote control to the remote control apparatus 210 through the control terminal 120 and the server 220 (S102). In the instant case, the vehicle data may include image information around the vehicle, surrounding object information, position and speed information of the vehicle, indoor image information, map information, and the like.

Accordingly, the remote control apparatus 210 may display the vehicle data received from the autonomous driving control apparatus 100 of the vehicle 10, which is a remote control target, on the screen, to enable the operator 230 to check it (S103). That is, the remote control apparatus 210 may display a map corresponding to the vehicle and a traveling path on a screen based on a current position of the vehicle 10. In the instant case, the map may be a precision map including a static object. Furthermore, the remote control apparatus 210 may overlap and display a vehicle position and surrounding object information on the map.

The remote control apparatus 210 receives selection of a remote control command from the operator 230 (S104), and transmits the selected remote control command to the autonomous driving control apparatus 100 of the vehicle 10 (S105). That is, the remote control apparatus 210 enables the operator 230 to check the remote control command list as illustrated in FIG. 5 on a screen, and to select a remote control command. In the instant case, the remote control apparatus 210 may prioritize and display items in the remote control command list to help the operator in selection. Furthermore, the remote control apparatus 210 may determine a priority in consideration of a collision risk degree, path efficiency, etc.

Furthermore, the remote control apparatus 210 may graphically distinguish and display priorities of items in the remote control command list such that the operator 230 can intuitively understand them. For example, items may be listed in an order of a remote control command having a higher priority as illustrated in FIG. 5. Accordingly, the remote control apparatus 210 enables the operator 230 to select one of the remote control command items by use of a point movement method, a mouse method, a touch method, and the like.

Accordingly, the autonomous driving control apparatus 100 may generate a new path based on the selected remote control command (S106), and may follow and control the generated path (S107).

Accordingly, according to various exemplary embodiments of the present invention, the operator 230 of the control system 20 may transmit a specific remote control command to the vehicle through the remote control apparatus 210 to enable autonomous driving to be continued when it is determined that the remote control of the autonomous vehicle is required. Furthermore, according to various exemplary embodiments of the present invention, the operator 230 may be enabled to intuitively select a remote control command by displaying vehicle data such as the current path and the obstacles on the screen to be recognized at a glance when the operator 230 requires the remote control of the autonomous vehicle. Accordingly, the present invention helps to ensure smooth driving when providing services such as passenger transportation and physical distribution transportation by use of the autonomous vehicle.

Figure 8:
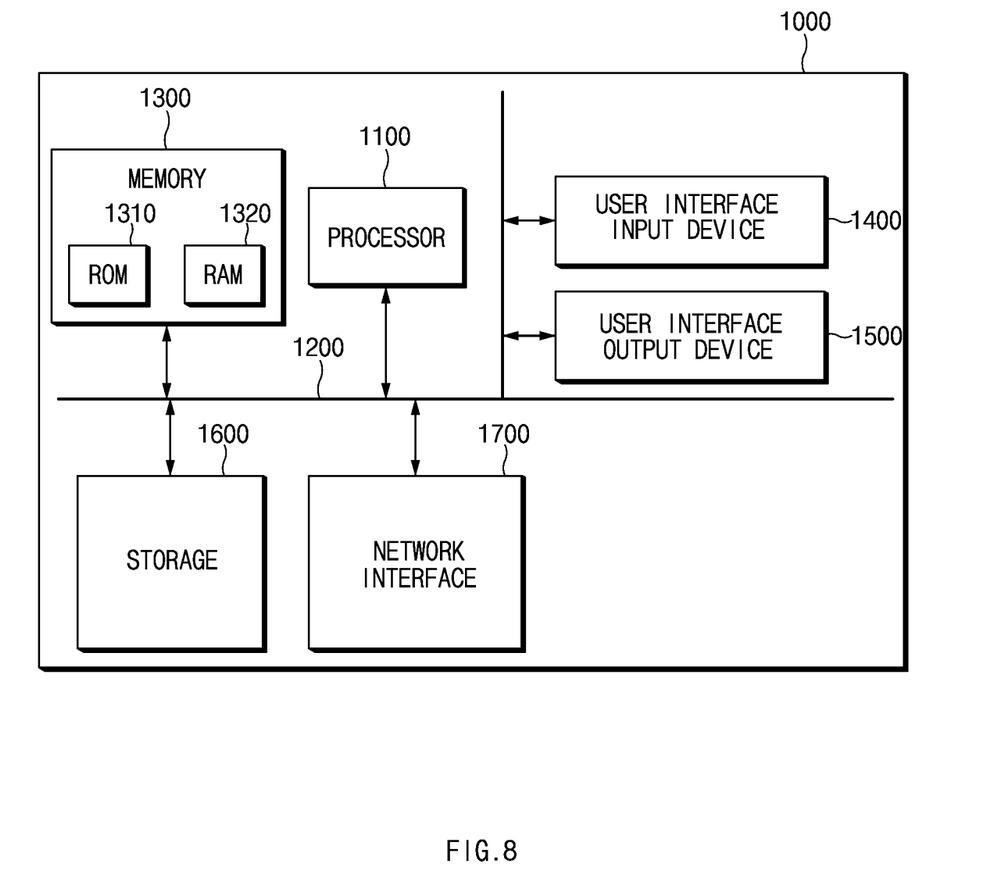
FIG. 8 illustrates a computing system according to various exemplary embodiments of the present invention.

FIG. 8 illustrates a computing system according to various exemplary embodiments of the present invention.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous vehicle comprising:
a processor configured to transmit vehicle data for remote control of the autonomous vehicle to a control system when the remote control of the autonomous vehicle is required, and when receiving a remote control command for the remote control from the control system, to generate and follow a path based on the received remote control command,
wherein the remote control command includes an ignoring a misrecognized object.

2. The autonomous vehicle of claim 1, further including:
a control terminal configured to communicate with the autonomous driving control apparatus and the control system.

3. The autonomous vehicle of claim 1, wherein the processor is configured to determine a situation in which the autonomous vehicle is unable to travel on an existing path due to a driving situation or an emergency situation as a situation requiring the remote control.

4. The autonomous vehicle of claim 1, wherein the vehicle data includes at least one of image information around the vehicle, surrounding object information, a position of the vehicle, a vehicle path, speed information of the vehicle, indoor image information, or map information.

5. The autonomous vehicle of claim 1, further including:
a sensing device configured to detect a vehicle surrounding situation and a vehicle indoor situation.

6. The autonomous vehicle of claim 1, wherein the remote control command further includes at least one of changing a lane, ignoring a maximum road speed, ignoring a traffic signal, or responding to a hand signal.

7. A control system comprising:
a processor configured to generate a remote control command list based on vehicle data received from an autonomous vehicle, to receive selection of one command in the remote control command list from an operator, and to transmit the selected remote control command to the autonomous vehicle when remote control of the autonomous vehicle is required,
wherein the remote control command includes an ignoring a misrecognized object.

8. The control system of claim 7, further including:
a display device configured to display the vehicle data.

9. The control system of claim 8, wherein the processor is configured to mark a current position of the autonomous vehicle, surrounding object information, and a vehicle path on a map to display the current position on the display device.

10. The control system of claim 7, wherein the processor is configured to generate the remote control command list by determining a priority of the remote control command using a collision risk degree.

11. The control system of claim 7, wherein the processor is configured to generate the remote control command list by determining a priority of the remote control command using path efficiency.

12. The control system of claim 8, wherein the processor is configured to display the remote control command list on a graphic basis.

13. The control system of claim 8, wherein the remote control command further includes at least one of changing a lane, ignoring a maximum road speed, ignoring a traffic signal, or responding to a hand signal.

14. The control system of claim 13, wherein the processor, when the ignoring of the misrecognized object is selected in the remote control command list, receives selection of an object to be ignored among surrounding objects from an operator.

15. The control system of claim 13, wherein the processor is configured to deactivate a remote control command having no drivable path in a current situation in the remote control command list.

16. The control system of claim 8, wherein the processor is configured to emphasize a remote control command having a highest priority in the remote control command list by use of at least one of displaying at a top, blinking, darkening, or highlighting.

17. The control system of claim 8, wherein the display device is configured to receive selection of one remote control command in the remote control command list from the operator by use of a mouse or a touch method.

18. A remote control method for an autonomous vehicle, the remote control method comprising:
receiving, by a remote control apparatus, vehicle data received from the autonomous vehicle when remote control of the autonomous vehicle is required;
generating and displaying, by the remote control apparatus, a remote control command list based on the vehicle data;
receiving, by the remote control apparatus, selection of one command of the remote control command list from an operator; and
transmitting, by the remote control apparatus, the selected remote control command to the autonomous vehicle,
wherein the selected remote control command includes an ignoring a misrecognized object.

19. The remote control method of claim 18, wherein the generating and displaying of the remote control command list includes generating the remote control command list by determining a priority of the remote control command using a collision risk degree.

20. The remote control method of claim 18, wherein the generating and displaying of the remote control command list includes generating a remote control command list by determining a priority of the remote control command using path efficiency.

* * * * *